US010877734B2

(12) United States Patent
Stairs et al.

(10) Patent No.: US 10,877,734 B2
(45) Date of Patent: *Dec. 29, 2020

(54) AUGMENTING AN ORIGINAL CLASS WITH AN AUGMENTING CLASS

(71) Applicant: Microsoft Technology Licensing, LLC, Redmond, WA (US)

(72) Inventors: John Stairs, Kirkland, WA (US); Marcos Calderon Macias, Seattle, WA (US); Peter Villadsen, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/355,254

(22) Filed: Mar. 15, 2019

(65) Prior Publication Data

US 2019/0212988 A1 Jul. 11, 2019

Related U.S. Application Data

(62) Division of application No. 15/160,973, filed on May 20, 2016, now Pat. No. 10,268,455.

(51) Int. Cl.
| *G06F 8/30* | (2018.01) |
| *G06F 9/448* | (2018.01) |
| *G06F 8/20* | (2018.01) |
| *G06F 8/51* | (2018.01) |
| *G06F 8/40* | (2018.01) |
| *G06F 8/41* | (2018.01) |

(52) U.S. Cl.
CPC ............... *G06F 8/316* (2013.01); *G06F 8/24* (2013.01); *G06F 8/30* (2013.01); *G06F 8/315* (2013.01); *G06F 8/40* (2013.01); *G06F 8/41* (2013.01); *G06F 8/51* (2013.01); *G06F 9/449* (2018.02); *G06F 9/4492* (2018.02); *G06F 8/423* (2013.01)

(58) Field of Classification Search
None
See application file for complete search history.

(56) References Cited

U.S. PATENT DOCUMENTS 7,516,449 B2 * 4/2009 Agrawal ............... G06F 8/38
717/165

* cited by examiner

*Primary Examiner* — Wynuel S Aquino
*Assistant Examiner* — Mark A Gooray
(74) *Attorney, Agent, or Firm* — Mannava & Kang, P.C.

(57) ABSTRACT

An augmenting system for augmenting a program's original class with an augmenting class is provided. In some embodiments, the augmenting system receives a definition of an augmenting class that includes a data member. The augmenting system generates resolution code for the computer program. The resolution code is for accessing a reference to an original instance of the original class and providing a reference to a corresponding augmenting instance of the augmenting class. When processing a statement of the computer program that accesses the data member using the reference to the original instance, the augmenting system generates access code for the computer program. The access code uses the resolution code to retrieve the reference to the augmenting instance for the original instance and accesses the data member based on the retrieved reference to the augmenting instance.

13 Claims, 5 Drawing Sheets

AUGMENTING AN ORIGINAL CLASS WITH AN AUGMENTING CLASS

PRIORITY

This application is a Divisional of commonly assigned and co-pending U.S. patent application Ser. No. 15/160,973, filed May 20, 2016, the disclosure of which is hereby incorporated by reference in its entirety.

BACKGROUND

Object-oriented programming ("OOP") is based on objects that can contain data members and methods (also referred to as function members). For example, an object that represents a vehicle may contain data members for storing the brand and the model year of the vehicle and a method for printing the values of the data members of the vehicles. The data members and methods for an object are specified by a class definition. For example, the class definition for a Vehicle class may be represented by the following pseudocode:

```
class Vehicle
{
    str brand;
    int year;
    void new( )
    {
        brand = null;
        year = 0;
    }
    public void displayInfo( )
    {
        print (brand);
        print (year)
    }
}
```

This class definition includes two methods: new and displayInfo. The new method is a constructor that is invoked to initialize a Vehicle object when the Vehicle object is instantiated (i.e., created). A Vehicle object identified by the variable V may be instantiated and the data members and methods may be accessed as represented by the following pseudocode:

```
Vehicle V = new Vehicle( );
V.year = 2016;
V.model = "Ford";
V.displayInfo( );
nextyear = V.year + 1;
```

OOP also allows one class to inherit the data members and methods of another class. For example, there are many different types or kinds of vehicles such as cars, trucks, and motorcycles. The vehicle types have some attributes in common and some attributes that are specific to the vehicle type. The common attributes may be brand and year. The car-specific attributes may include whether the car is a convertible and has a sun roof, and the truck-specific attributes may include maximum payload and maximum towing capacity. Although separate classes can be defined for each vehicle type, each class defining data members for the common attributes along with data members for the vehicle type-specific attributes, OOP inheritance allows the common attributes to be defined once and then inherited by the vehicle type-specific classes. The Vehicle class defines the data members and methods that are common to all vehicles.

The inheritance of the Vehicle class by a Car class, a subclass of the Vehicle class, is represented by the following pseudocode:

```
class Car : Vehicle
{
    Boolean convertible;
    public void new( )
    {
        super( );
        convertible = true;
    }
    public void displayInfo ( )
    {
        super( );
        print (convertible);
    }
}
```

A Car object may be instantiated and accessed as represented by the following pseudocode:

```
Car C = new Car( );
C.year = 2016;
C.model = "Ford";
C.convertible = false;
C.displayInfo( );
```

The print method will print the following:
2016
Ford
hard top

Developers of application programs, such as customer relationship management ("CRM") systems or enterprise resource planning ("ERP") systems, allow users of the application programs (e.g., organizations that license the application programs) to customize the application programs to meet their needs. For example, an application program may include the Vehicle class, and a user may define the Car class, which inherits the Vehicle class, to perform some car-specific processing.

In some cases, a user would like to add a new data member that is common to all vehicles, such as color of the vehicle. The user could customize the application program by modifying the Vehicle class to add the color data member and modifying the application program to access the color data member. The user would then need to recompile the application program including the source code of the modified Vehicle class. This requires that the developer provide the source code to the user, which the developer may not want to do. Even if the developer did provide the source code to the user, the modifying of the source code of the Vehicle class by the user would present maintenance problems each time the developer releases a modified version of the Vehicle class. In such a case, the user would need to reapply the customizations to the application program. As an alternative to modifying the Vehicle class, the user could modify each class that inherits the Vehicle class, such as a Car class and a Truck class, to add the color data member. As another alternative, the user could create, for each subclass that inherits from the Vehicle class, a class inherits that subclass and includes the color data member. Although these alternatives do not require having access to and recompiling the source code of the Vehicle class, the alternatives result in duplication of source code for each class that inherits from the Vehicle class, which is error-prone and increases the cost of maintenance.

SUMMARY

An augmenting system for augmenting a computer program's original class with an augmenting class is provided. In some embodiments, the augmenting system receives a definition of an augmenting class that includes a data member. The augmenting system generates resolution code for the computer program. The resolution code uses a reference to an instance of the original class to provide a reference to a corresponding instance of the augmenting class and to instantiate the corresponding instance of the augmenting class if not already instantiated. When processing a statement of the computer program that accesses the data member using the reference to the instance of the original class, the augmenting system generates access code for the computer program. The access code uses the resolution code to retrieve the reference to the corresponding instance of the augmenting class and accesses the data member using the retrieved reference to the instance of the augmenting class.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
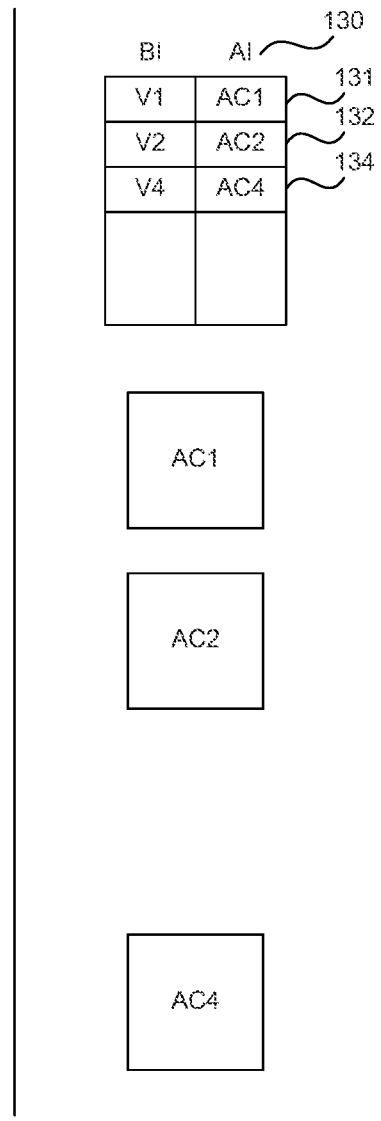
FIG. 1 is a diagram illustrating a layout for an original class and an augmenting class in some embodiments.
Figure 1:
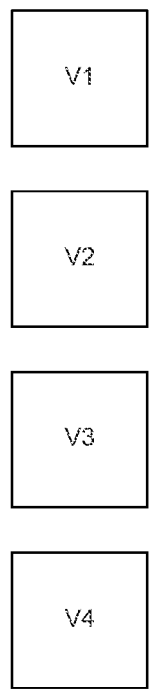

A method and system for augmenting an original class with a data member not defined in the definition of the original class is provided. In some embodiments, an augmenting system is provided that allows an augmenting class with a data member to augment an original class so that the data member can be accessed as if it were defined in the original class. To augment an original class, the source code of a computer program includes a definition of an augmenting class that specifies the data member. For example, an augmenting class may be defined as represented by the following pseudocode:

```
class AddColor
{
    str color;
}
```

The source code also includes an augmentation statement that indicates that the original class is augmented with the augmenting class. The augmentation statement may not be part of the programming language, but rather may be considered metadata that informs a compiler or a pre-compilation component that the augmenting class augments the original class. For example, if the AddColor class augments the Vehicle class, the augmentation statement may be as follows:

[AddColor augments Vehicle]

Alternatively, the augmentation statement may identify the original class explicitly and identify the augmenting class as the class immediately following the augmentation statement as follows:

```
[Augments(Vehicle)]
class AddColor
{
    str color;
}
```

The source code also includes a statement to instantiate the original class. For example, the statement to instantiate an original instance of the original class may be represented by the following pseudocode:

```
Vehicle V = new Vehicle( );
```

The source code includes a statement to access the data member of the augmenting class using a reference to the original instance. For example, the statement to access the data member may be represented by the following pseudocode:

```
V.color = "red";
```

When the augmenting system processes a statement to access a data member of the augmenting class using a reference to an original class, it generates code that instantiates an instance of the augmenting class (referred to as an "augmenting instance") that corresponds to the original instance if one has not already been instantiated. As a result, the augmenting system generates code to instantiate an augmenting instance for each original instance whose reference was used to access the data member. The augmenting system then generates code to access the data member of the augmenting instance, rather than accessing a data member of the original instance.

In this way, the source code can be developed as if the data member were defined in the original class itself except for the inclusion of the augmenting class definition and the augmentation statement indicating that the augmenting class augments the original class. Moreover, since the original instance of an augmented original class is the same as an original instance of a non-augmented original class, the computer code that augments the original class can interoperate with computer code that uses a non-augmented original class. For example, computer code that augments the original class can pass a reference to an original instance of the augmented original class to a subroutine that has no knowledge of the augmentation and expects a reference to an original instance of the original class. Thus, a user of an application program developed by another can generate custom code that augments an original class of the application program and that can interoperate with the application program without having to modify and/or recompile the source code of the application program. Moreover, the original class can be modified by the developer to, for example, add a new data member or change an implementation of a function member. The developer can then release a new assembly for the modified original class. The user can use that new assembly with an assembly for the custom code to generate an executable of the application program without having to modify the custom code. Similarly, the user can further modify the custom code and generate a new assembly that can be used with assembly provided by the developer without having to reapply any customizations. Thus, the augmentation system allows the application program and customizations that augment classes of the application program to be developed and modified separately.

The augmenting system allows an original class to be augmented by multiple augmenting classes. Each member of the augmenting classes can be accessed as if it was actually defined by the original class. As another example, when a subclass inherits an original class that has been augmented, the members of the augmenting class can be accessed using a reference to an instance the subclass for non-static members and a reference to the subclass for static members. For example, if the Vehicle class were an abstract that was augmented by the AddColor class and inherited by the Car class. The access of the color data member of the AddColor class can be represented by the following pseudocode:

```
Car C = new Car( );
C.brand = "Honda";
C.year = 2016;
C.color = "red";
```

The last statement access the color data member of the augmenting class using a reference to the instance of the Car class. Rather than augmenting the Vehicle class, the Car class could have been augmented with the AddColor class. In such a case, a Truck class that also inherits the Vehicle class would need to also be augmented with the AddColor class to access the color data member.

In some embodiments, the augmenting system may be implemented to process original source code during a pre-compilation phase to generate a modified version of the source code or during compilation of the original source code. If implemented during a pre-compilation phase, the augmenting system may be implemented as a front-end to a compiler that generates a modified version of the source code to support the augmentation of original classes. The modified version can then be compiled by the compiler to generate assembly code that supports the augmentation of the original classes. If implemented during compilation of the original source code, the augmenting system may be implemented as a modification to a compiler that generates assembly code that supports the augmentation of original classes. In either case, the augmenting system receives a definition of an augmenting class in the original source code that includes one or more data members or function members. For example, the augmenting class may be specified by the following pseudocode:

```
[Augments(Vehicle)]
class AddColor
{
   str color;
}
```

In some embodiments, the augmenting system may add a static mapping data structure to the augmenting class to map each original instance of the original class to a corresponding augmenting instance of the augmenting class. The mapping data structure is static in the sense that there is only one occurrence of the mapping data structure that is shared by all augmenting instances of the augmenting class. The mapping data structure may be a table of entries, each of which stores a reference to an original instance and a reference to the corresponding augmenting instance.

The augmenting system may also add a resolution function to the augmenting class that is passed a reference to an original instance and returns a reference to the corresponding augmenting instance. If the mapping data structure indicates that the corresponding augmenting instance has not been instantiated, the resolution function instantiates the corresponding augmenting instance and updates the mapping data structure. For example, the resolution function may search the mapping data structure for an entry with a reference to the passed original instance. If an entry is found, the resolution function returns the reference to the corresponding augmenting instance. If an entry is not found, the resolution function instantiates the corresponding augmenting instance, adds an entry to the table for the passed original instance and the newly instantiated augmenting instance, and returns the reference to the newly instantiated augmenting instance.

The augmenting system generates access code (e.g., assembly code) for source code that accesses the data member using a reference to an original instance. The access code invokes the resolution function of the augmenting class, passing a reference to the original instance, and accesses the data member using the reference to the augmenting instance returned by the resolution function. Thus, a computer program that augments an original class can access a data member of the augmenting class in the same way as a data member of the original class is accessed.

The following example illustrates the access code generated by the augmenting system. The augmenting class of the source code in this example is represented by the following pseudocode:

```
[Augments(Vehicle)]
class AddColor
{
   str color;
}
```

The augmentation system generates assembly code as if the augmenting class were represented by the following pseudocode:

```
1.  class AddColor
2.  {
3.     Static Map<Vehicle, AddColor> BIAIMap;
4.     str color;
5.     static int getAI(Vehicle BI)
6.     {
7.        if (BIAIMap.Contains(BI))
8.           {return BIAIMap[BI]};
9.        AddColor AI;
10.       AI = new AddColor( );
11.       BIAIMap[BI] = AI;
12.       return AI;
13.    }
```

The pseudocode in bold is a logical representation of the assembly code that is generated by the augmentation system. Line 3 represents the adding of the mapping data structure to the augmenting class. The base-instance-to-augmenting-instance map ("BIAIMap") is the mapping data structure and is declared as static. Lines 5-12 represent the added resolution function ("getAI") that returns a reference to an augmenting instance. The resolution function is passed a reference to an original instance ("BI") and returns a reference to the corresponding augmenting instance. Lines 7-8 determine whether BIAIMap contains an entry that maps the original instance to a corresponding augmenting instance. If an entry is found, then the reference to the augmenting instance in the entry is returned. If an entry is not found, lines 9-12 instantiate an augmenting instance ("AI"), add an entry to BIAIMap, and return a reference to the augmenting instance.

The augmenting system also generates access code for code that accesses a data member of an augmenting class. The source code that accesses data members of the original class and the augmenting class may be represented by the following pseudocode:

```
{
    Vehicle V = new Vehicle( );
    V.brand = "Honda";
    V.year = 2016;
    V.color = "red";
}
```

The access code may be logically represented by the following pseudocode:

```
{
    Vehicle V = new Vehicle( );
    V.brand = "Honda";
    V.year = 2016;
    AddColor::getAI(V).color = "red";
}
```

The first three statements are the same because they instantiate the original instance and access a data member of the original instance and not in the augmenting instance. The last statement invokes the getAI function of the AddColor class, which is the augmenting class, and uses the reference to the augmenting instance that is returned to set the color data member of the augmenting instance.

In some embodiments, the augmenting system may allow non-static function members, static function members, and static data members to be specified in an augmenting class. To support non-static function members, the augmenting system may add an original instance data member to the augmenting class. When the resolution function instantiates an augmenting instance, the resolution function adds an entry to the mapping data structure and also sets the original instance data member to reference the original instance. The augmenting system also causes any access in the non-static function member to a data member of the original instance to use the original instance data member to access that data member. Alternatively, rather than adding an original instance data member to the augmenting class, the augmenting system may cause any access in the non-static function member to invoke a resolution function that retrieves the reference to the original instance from the mapping data structure. To support static members (i.e., static data members and static function members), the augmenting system causes each access to a static member, which uses a reference to the augmenting class (e.g., Vehicle::static_data_member or Vehicle::static_function_member( )), to access (i.e., invoke in the case of a function member) the static member of the augmenting class.

FIG. 1 is a diagram illustrating a layout for an original class and an augmenting class in some embodiments. The diagram represents the layout after execution of the following pseudo code.

```
1.   Vehicle V1 = new Vehicle( );
2.   V1.brand = "Honda";
3.   V1.color = "silver";
4.   Vehicle V2 = new Vehicle( );
5.   V2.color = "black";
6.   Vehicle V3 = new Vehicle( );
7.   V3.year = 2015;
8.   Vehicle V4 = new Vehicle( )
9.   V4.brand = "Honda";
10.  V4.color = "white";
11.  V4.color = "red";
```

The diagram includes the Vehicle layout 110 for the Vehicle class and the AddColor layout 120 for the AddColor class. The Vehicle layout includes Vehicle instances V1-V4. The AddColor layout includes AddColor instances AC1, AC2, and AC4 and a mapping data structure 130. When line 1 is executed, Vehicle instance V1 is instantiated. When line 2 is executed, the brand data member of Vehicle instance V1 is set. When line 3 is executed, the resolution function is executed passing a reference to Vehicle instance V1. The resolution function determines that the mapping data structure does not contain an entry for Vehicle instance V1. Based on this determination, the resolution function instantiates AddColor instance AC1, adds an entry 131 to the mapping data structure that maps Vehicle instance V1 to AddColor instance AC1, and returns a reference to the AddColor instance AC1. Upon return, the reference to the AddColor instance AC1 is used to set the color data member of AddColor instance AC1.

When line 4 is executed, Vehicle instance V2 is instantiated. When line 5 is executed, the resolution function is executed passing a reference to Vehicle instance V2. The resolution function determines that the mapping data structure does not contain an entry for Vehicle instance V2. Based on this determination, the resolution function instantiates AddColor instance AC2, adds an entry 132 to the mapping data structure that maps Vehicle instance V2 to AddColor instance AC2, and returns a reference to the AddColor instance AC2. Upon return, the reference to the AddColor instance AC2 is used to set the color data member of AddColor instance AC2.

When line 6 is executed, Vehicle instance V3 is instantiated. When line 7 is executed, the year data member of Vehicle instance V3 is set. Since a statement that accesses the color data member of the AddColor class is not present in the pseudo code, an AddColor instance corresponding to Vehicle instance V3 is not instantiated. If a statement is eventually executed that sets or gets the color data member using a reference to Vehicle instance V3, then an AddClass instance V3 would be instantiated and an entry added to the mapping data structure.

When line 8 is executed, Vehicle instance V4 is instantiated. When line 9 is executed, AddColor instance AC4 is instantiated and entry 134 is added to the mapping data structure in the same way as discussed above for lines 3 and 6. When line 10 is executed, the resolution function is invoked passing a reference to Vehicle instance V4. The resolution function determines that the mapping data structure already contains an entry for Vehicle instance V4. So the resolution function returns a reference to AddColor V4.

Upon return, the reference to the AddColor instance AC4 is used to set the color data member of AddColor instance AC4.

Figure 2:
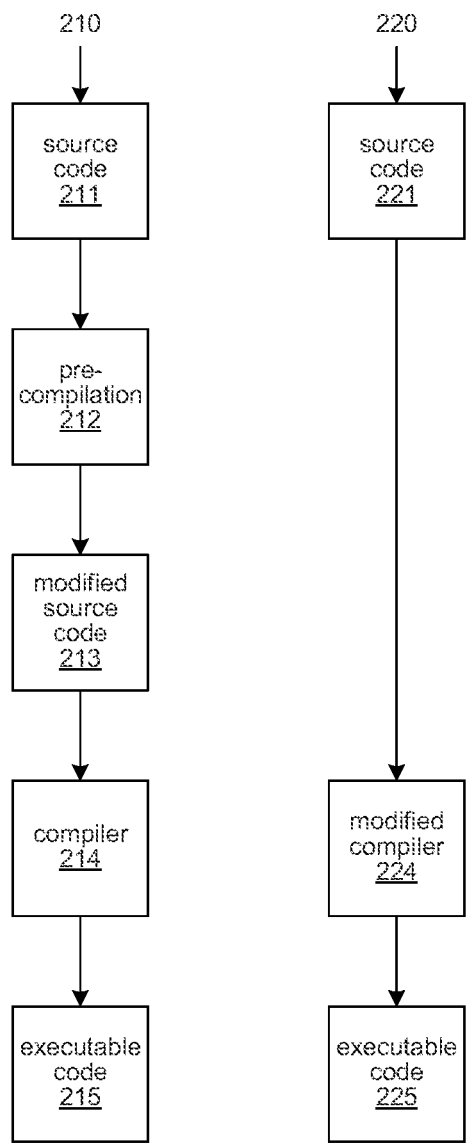
FIG. 2 is a diagram that illustrates two embodiments of the augmenting system.

FIG. 2 is a diagram that illustrates two embodiments of the augmenting system. The diagram illustrates a pre-compilation embodiment 210 and a modified compiler embodiment 220. In the pre-compilation embodiment, a pre-compilation component 212 implements the augmenting system. The pre-compilation component inputs source code 211 that includes an augmenting class. The pre-compilation component generates a modified version of the source code. In the modified version, the pre-compilation component adds a mapping data structure and a resolution function to the definition of the augmenting class. The pre-compilation component also modifies each access to a data member of the augmenting class via a reference to an original instance to use the resolution function. The pre-compilation component outputs the modified version of the source code 213, which is compiled by a compiler 214 to generate executable, assembly code, or object code 215. The compiler need not be modified when the pre-compilation component is used. In the modified compiler embodiment, the compiler has been modified to generate a modified compiler 224. The modified compiler inputs source code 221 that includes an augmenting class and generates executable, assembly, or object code 225 as if the augmenting class had included a mapping data structure and a resolution function and as if each access to a data member of the augmenting class was via the resolution function.

Figure 5:
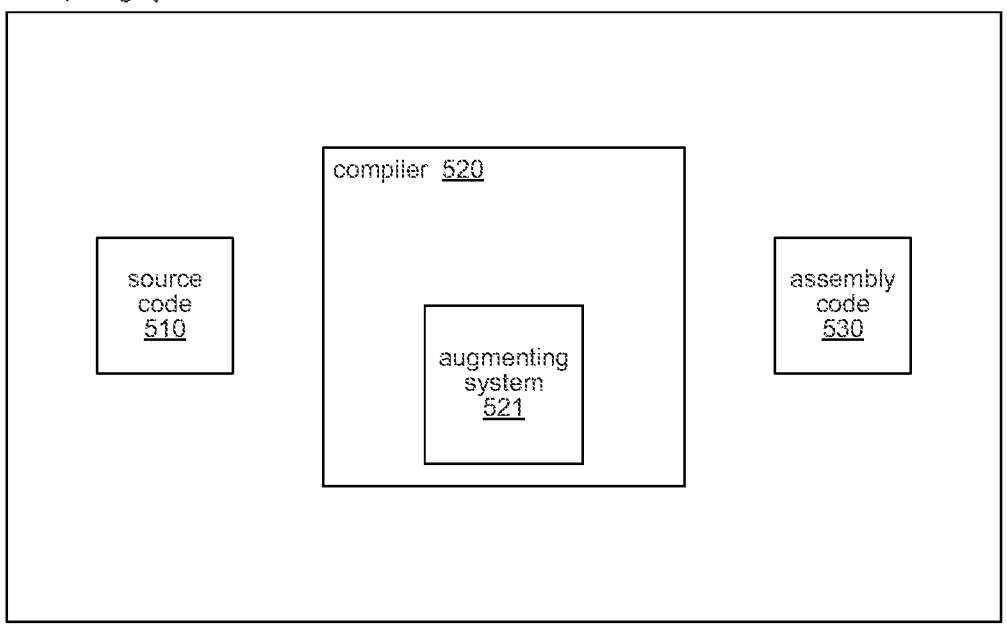
FIG. 5 is a block diagram that illustrates a computing system on which the augmenting system may be implemented.

FIG. 5 is a block diagram that illustrates a computing system on which the augmenting system may be implemented. A computing system 500 stores source code 510, compiler 520, and assembly code 530. The source code includes statements that define an augmenting class, indicate that the augmenting class augments an original class, instantiate an original instance of the original class, and access a data member of the augmenting class using a reference to the original instance. The compiler may be a conventional compiler that has been modified to include an implementation of an augmenting system 521. The compiler has been modified to generate assembly code with a static mapping data structure and a static resolution function added to the augmenting class. The resolution function is passed a reference to an original instance (or a derived instance that inherits the original class) and returns a reference to a corresponding augmenting instance of the augmenting class. The compiler also generates assembly code for source code statements that access the data member using a reference to the original instance (or derived instance). The generated assembly code invokes the resolution function passing the reference to the original instance and using the returned reference to the augmenting instance to access the data member.

The computing systems on which the augmenting system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have data recorded on them or may be encoded with computer-executable instructions or logic that implements the augmenting system. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting deployment data using the keys.

The augmenting system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the augmenting system may be implemented in hardware using, for example, an application-specific integrated circuit (ASIC).

Figure 3:
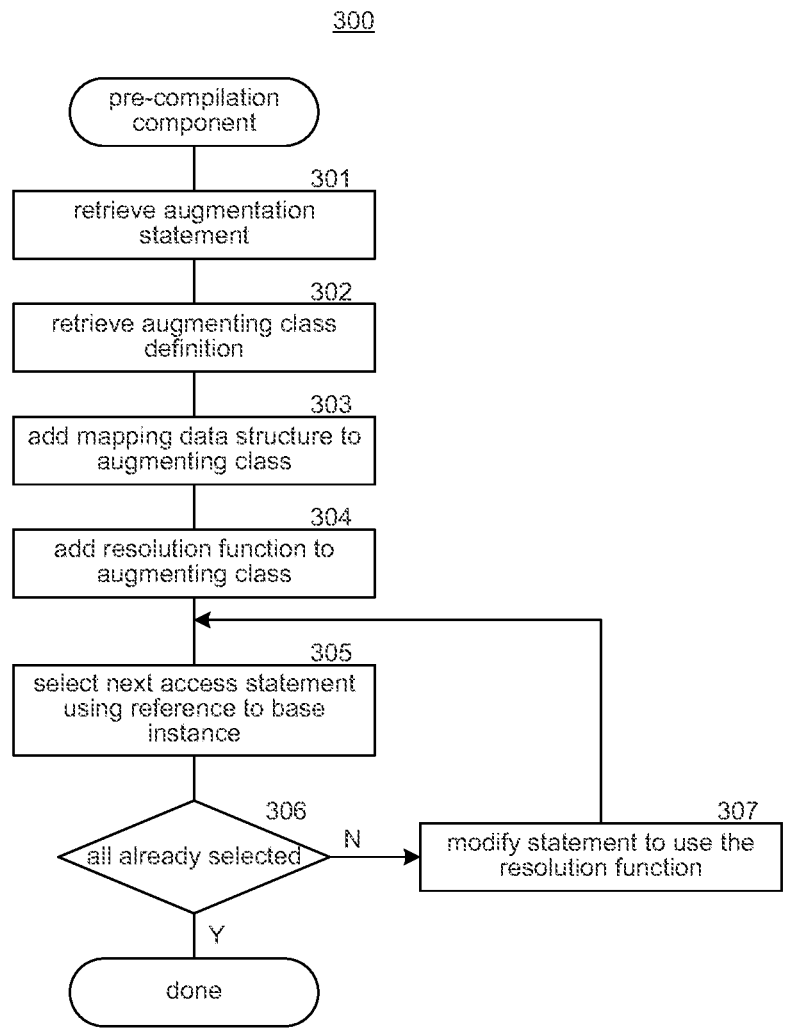
FIG. 3 is a flow diagram that illustrates the processing of a pre-compilation component in some embodiments.

FIG. 3 is a flow diagram that illustrates the processing of a pre-compilation component in some embodiments. A pre-compilation component 300 inputs source code that includes an augmenting class and outputs modified source code. In block 301, the component retrieves an augmentation statement from the source code. In block 302, the component retrieves the definition of the corresponding augmenting class from the source code. In block 303, the component adds a definition of a mapping data structure to the augmenting class definition. In block 304, the component adds a resolution function to the augmenting class definition. In blocks 305-307, the component loops modifying each access to a data member of the augmenting class via a reference to the original instance to use the resolution function. The component then outputs the modified source code and completes.

Figure 4:
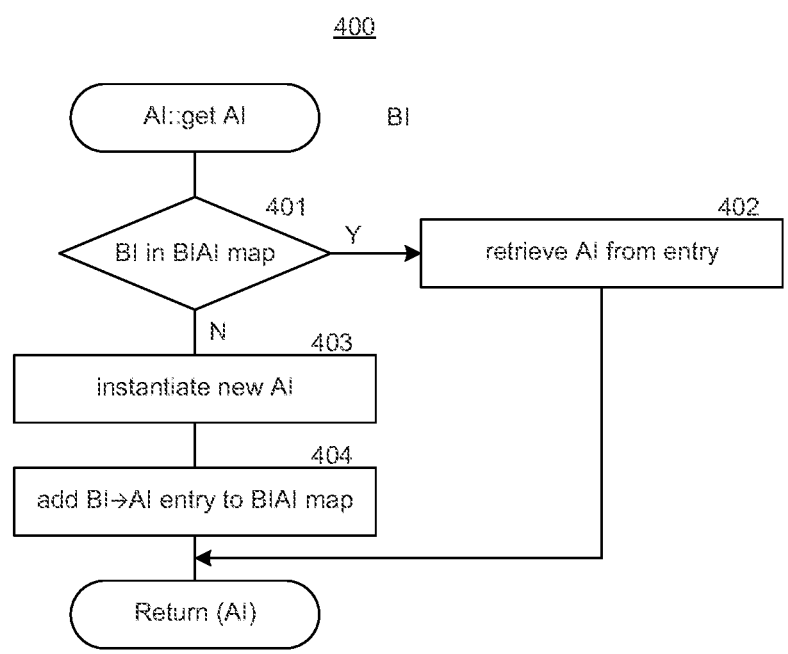
FIG. 4 is a flow diagram that illustrates the processing of a resolution function in some embodiments.

FIG. 4 is a flow diagram that illustrates the processing of a resolution function in some embodiments. A resolution function 400, named getAI, is passed a reference to an original instance and returns a reference to a corresponding augmenting instance. In decision block 401, the function determines whether an entry for the original instance is in the mapping data structure. If so, the function retrieves the reference to the corresponding augmenting instance from the entry in block 402 and then returns the reference. If not, the function continues at block 403. In block 403, the function instantiates a new augmenting instance. In block 404, the function adds to the mapping data structure an entry that maps the original instance to the augmenting instance and then returns the reference to the augmenting instance.

The following paragraphs describe various embodiments of aspects of the augmenting system. An implementation of the augmenting system may employ any combination of the embodiments. The processing described below may be performed by a computing device with a processor that executes computer-executable instructions stored on a computer-readable storage medium that implements the augmenting system.

In some embodiments, a computer-readable storage medium that stores a computer program that augments an original class with an augmenting class is provided. The computer program comprising statements that define the augmenting class wherein the augmenting class includes a data member. The statements indicate that the augmenting class augments the original class. The statements instantiate an original instance of the original class. The statements access the data member of the augmenting class using a reference to the original instance. In some embodiments, the statements that define, instantiate, and access are statements of a programming language. In some embodiments, the statement that indicates is not part of the programming language. In some embodiments, the statement that indicates is metadata of the computer program. In some embodiments, the metadata indicates to a compiler that the augmenting class augments the original class. In some embodiments, the programming language is object-oriented. In some embodiments, the statements do not include a statement to instantiate the augmenting class.

In some embodiments, a method performed by a computing device for augmenting an original class with an augmenting class is provided. The method receives a definition of the augmenting class wherein the augmenting class includes a data member. The method adds a static mapping data structure to the augmenting class to map each original instance of the original class to a corresponding augmenting instance of the augmenting class. The method adds a resolution function to the augmenting class that is passed a reference to the original instance and returns a reference to the corresponding augmenting instance of the augmenting class. The resolution function is adapted to, if the mapping data structure indicates that the corresponding augmenting instance has not been instantiated, instantiate the corresponding augmenting instance and update the mapping data structure to indicate that the corresponding augmenting instance has been instantiated. The method generates code for code that accesses the data member using a reference to an original instance wherein the generated code invokes the resolution function of the augmenting class passing the original instance and accessing the data member using a reference to the augmenting instance returned by the resolution function. In some embodiments, the definition of the augmenting class and the code that accesses the data member are specified using an object-oriented programming language. In some embodiments, the mapping data structure, for each original instance with a corresponding augmenting instance, contains an entry with a reference to the original instance and a reference to the corresponding augmenting instance. In some embodiments, the resolution function is further adapted to, if the mapping data structure indicates that the corresponding augmenting instance has been instantiated, retrieve from the mapping data structure a reference to the corresponding augmenting instance. In some embodiments, the method receives metadata indicating that the augmenting class augments the original class. In some embodiments, the adding of the static mapping data structure, the adding of the resolution function, and the modifying are performed during compilation of a computer program. In some embodiments, the computer program includes statements that define the augmenting class, indicate that the augmenting class augments the original class, instantiate an original instance of the original class, and access the data member of the augmenting class using a reference to the original instance.

In some embodiments, a computing system for compiling a computer program with an original class that is augmented with an augmenting class is provided. The computing system includes a computer-readable storage medium storing instructions and a processor for executing the instructions stored in the computer-readable storage medium. The instructions receive a definition of the augmenting class where the augmenting class includes a data member. The instructions generate resolution code for the computer program. The resolution code is for accessing a reference to an original instance of the original class and providing a reference to a corresponding augmenting instance of the augmenting class. The instructions, when compiling a statement of the computer program that accesses the data member using the reference to the original instance, generate access code for the computer program. The access code for using the resolution code to use a reference to the original instance to retrieve the reference to the augmenting instance and for accessing the data member based on the retrieved reference. In some embodiments, multiple augmenting classes augment the original class. In some embodiments, the resolution code is adapted to access a mapping data structure that, for each original instance with a corresponding augmenting instance, contains an entry with a reference to the original instance and a reference to the corresponding augmenting instance. In some embodiments, the resolution code is a function that is adapted to, when a mapping data structure indicates that the corresponding augmenting instance has not been instantiated, instantiate the augmenting instance, add a mapping from the original instance to the augmenting instance, and provide the reference to the augmenting instance. The resolution code is further adapted to, when the mapping data structure indicates that the corresponding augmenting instance has been instantiated, retrieve from the mapping data structure the mapping from the original instance to the augmenting instance and provide the reference to the augmenting instance. In some embodiments, the instructions further receive metadata indicating that the augmenting class augments the original class.

In some embodiments, a method performed by a computing system for processing a computer program with an original class that is augmented with an augmenting class is provided. The method receives a definition of the augmenting class where the augmenting class includes a data member. The method, when processing a statement of the computer program that accesses the data member using a reference to an original instance of the original class, generates access code for the computer program. The access code is adapted to instantiate an augmenting instance of the augmenting class and access the data member of the augmenting instance. In some embodiments, the static member is a data member. In some embodiments, the static member is a function member.

In some embodiments, a computer-readable storage medium storing a computer program that augments an original class with an augmenting class is provided. The computer program includes statements. The statements define the augmenting class where the augmenting class including a data member. The statements indicate that the augmenting class augments the original class. The statements instantiate a derived instance of a derived class that inherits the original class. The statements access the data member of the augmenting class using a reference to the derived instance.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computer-readable storage medium storing a computer program including statements which, when executed by a processor, cause the processor to:
identify from pre-compiling or compiling of source code, an augmentation statement, wherein the source code defines an augmenting class for augmenting an original class with the augmenting class, and specifies a data member to augment the original class, and wherein the augmentation statement indicates that the augmenting class augments the original class;
responsive to identifying the augmentation statement,
add a mapping data structure to the augmenting class in the source code, the mapping data structure to map an original instance of the original class to a corresponding augmenting instance of the augmenting class; and
add a resolution function to the augmenting class in the source code, the resolution function to cause the processor to:
receive a reference to the original instance;
return a reference to the corresponding augmenting instance of the augmenting class;
determine that the mapping data structure indicates that the corresponding augmenting instance has not been instantiated;
instantiate the corresponding augmenting instance in response to determining that the mapping data structure indicates that the corresponding augmenting instance has not been instantiated; and
update the mapping data structure to indicate that the corresponding augmenting instance has been instantiated,
wherein executing executable code generated from the source code instantiates the original instance of the original class, and accesses the data member of the augmenting class using the reference to the original instance.

2. The computer-readable storage medium of claim 1, wherein a statement for defining the augmenting class, and statements for instantiating the original instance and accessing the data member of the augmenting class are statements of a programming language.

3. The computer-readable storage medium of claim 2, wherein the augmentation statement is not part of the programming language.

4. The computer-readable storage medium of claim 2, wherein the augmentation statement is metadata of a computer program.

5. The computer-readable storage medium of claim 4, wherein the metadata indicates to a compiler that the augmenting class augments the original class.

6. The computer-readable storage medium of claim 1, wherein the statements do not include a statement to instantiate the augmenting class.

7. The computer-readable storage medium of claim 1, wherein the executing executable code generated from the source code to access the data member of the augmenting class using the reference to the original instance comprises accessing the data member using the reference to the corresponding augmenting instance returned by the resolution function.

8. A computing system comprising:
a processor; and
a computer-readable storage medium storing a computer program that augments an original class with an augmenting class, the computer program comprising statements that when executed by the processor, cause the processor to:
identify from pre-compiling or compiling of source code, an augmentation statement, wherein the source code defines the augmenting class for augmenting the original class with the augmenting class, and specifies a data member to augment the original class, and wherein the augmentation statement indicates that the augmenting class augments the original class;
responsive to identifying the augmentation statement,
add a mapping data structure to the augmenting class in the source code, the mapping data structure to map an original instance of the original class to a corresponding augmenting instance of the augmenting class; and
add a resolution function to the augmenting class in the source code, the resolution function to cause the processor to:
receive a reference to the original instance;
return a reference to the corresponding augmenting instance of the augmenting class;
determine that the mapping data structure indicates that the corresponding augmenting instance has not been instantiated;
instantiate the corresponding augmenting instance in response to determining that the mapping data structure indicates that the corresponding augmenting instance has not been instantiated; and
update the mapping data structure to indicate that the corresponding augmenting instance has been instantiated,
wherein executing executable code generated from the source code instantiates the original instance of the original class, and accesses the data member of the augmenting class using the reference to the original instance.

9. The computing system of claim 8, wherein a statement for defining the augmenting class, and statements for instantiating the original instance and accessing the data member of the augmenting class are statements of a programming language.

10. The computing system of claim 9, wherein the augmentation statement is metadata and is not part of the programming language, wherein the metadata indicates to a compiler that the augmenting class augments the original class.

11. The computing system of claim 9, wherein the programming language is object-oriented.

12. The computing system of claim 8, wherein the executing executable code generated from the source code to access the data member of the augmenting class using the reference to the original instance comprises accessing the data member using the reference to the corresponding augmenting instance returned by the resolution function.

13. A method executed by a processor, the method comprising:
identifying from pre-compiling or compiling of source code, an augmentation statement, wherein the source code defines an augmenting class for augmenting an original class with the augmenting class, and specifies a data member to augment the original class, and wherein the augmentation statement indicates that the augmenting class augments the original class;
responsive to identifying the augmentation statement,
adding a mapping data structure to the augmenting class in the source code, the mapping data structure to map an original instance of the original class to a corresponding augmenting instance of the augmenting class; and adding a resolution function to the augmenting class in the source code, the resolution function to cause the processor to:

receive a reference to the original instance;

return a reference to the corresponding augmenting instance of the augmenting class;

determine that the mapping data structure indicates that the corresponding augmenting instance has not been instantiated;

instantiate the corresponding augmenting instance in response to determining that the mapping data structure indicates that the corresponding augmenting instance has not been instantiated; and update the mapping data structure to indicate that the corresponding augmenting instance has been instantiated, wherein executing executable code generated from the source code instantiates a derived instance of a derived class that inherits the original class, and accesses the data member of the augmenting class using a reference to the derived instance.

* * * * *